(12) United States Patent
Dike

(10) Patent No.: US 7,590,788 B2
(45) Date of Patent: Sep. 15, 2009

(54) CONTROLLING TRANSMISSION ON AN ASYNCHRONOUS BUS

(75) Inventor: Charles E. Dike, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 136 days.

(21) Appl. No.: 11/978,339

(22) Filed: Oct. 29, 2007

(65) Prior Publication Data

US 2009/0113084 A1  Apr. 30, 2009

(51) Int. Cl.
*G06F 13/362* (2006.01)
*G06F 3/00* (2006.01)

(52) U.S. Cl. .......................... 710/309; 710/36; 710/241

(58) Field of Classification Search .................. 710/305, 710/306, 36, 113, 114, 116–118, 240, 241, 710/309
See application file for complete search history.

(56) References Cited

U.S. PATENT DOCUMENTS

| | | | |
|---|---|---|---|
| 5,790,535 A | * | 8/1998 | Kou ........................ 370/337 |
| 5,935,233 A | * | 8/1999 | Jeddeloh .................... 710/306 |
| 6,425,034 B1 | * | 7/2002 | Steinmetz et al. ........... 710/305 |
| 7,035,956 B2 | * | 4/2006 | Tanaka ...................... 710/306 |
| 7,206,869 B2 | * | 4/2007 | Shishizuka et al. ........... 710/20 |
| 7,487,300 B2 | * | 2/2009 | Kessels et al. .............. 711/150 |
| 2006/0190658 A1 | * | 8/2006 | Hammitt et al. ............. 710/309 |
| 2007/0226391 A1 | * | 9/2007 | Higuchi et al. .............. 710/305 |

* cited by examiner

*Primary Examiner*—Glenn A Auve
*Assistant Examiner*—Trisha Vu
(74) *Attorney, Agent, or Firm*—Trop, Pruner & Hu, P.C.

(57) ABSTRACT

In one embodiment, the present invention includes a bus controller including a mutual exclusion unit to receive a data transmission request from first and second agents and to select one of the agents for servicing based on which agent is the first to send the request, multiple selection units controlled by the mutual exclusion unit, and a two-phase register coupled to at least one of the selection units to transmit data from the selected agent. Other embodiments are described and claimed.

15 Claims, 4 Drawing Sheets

CONTROLLING TRANSMISSION ON AN ASYNCHRONOUS BUS

BACKGROUND

Modern computer systems typically include multiple semiconductor devices coupled together on a circuit board by one or more standardized buses. Typically, these buses are multi-drop buses in which multiple components connect to a single bus. Communication along such buses is typically by a synchronous communication protocol.

As systems become ever smaller and include more components, there is a focus on creating ultra-mobile devices that include a small number of integrated circuits. One design focus is to incorporate virtually all desired functionality into a single semiconductor device. Communications between different functionalities of the device may occur synchronously or asynchronously. Current mechanisms for handling asynchronous communications on a bus connected to such devices typically require great complexity and implementation costs.

DETAILED DESCRIPTION

Figure 1:
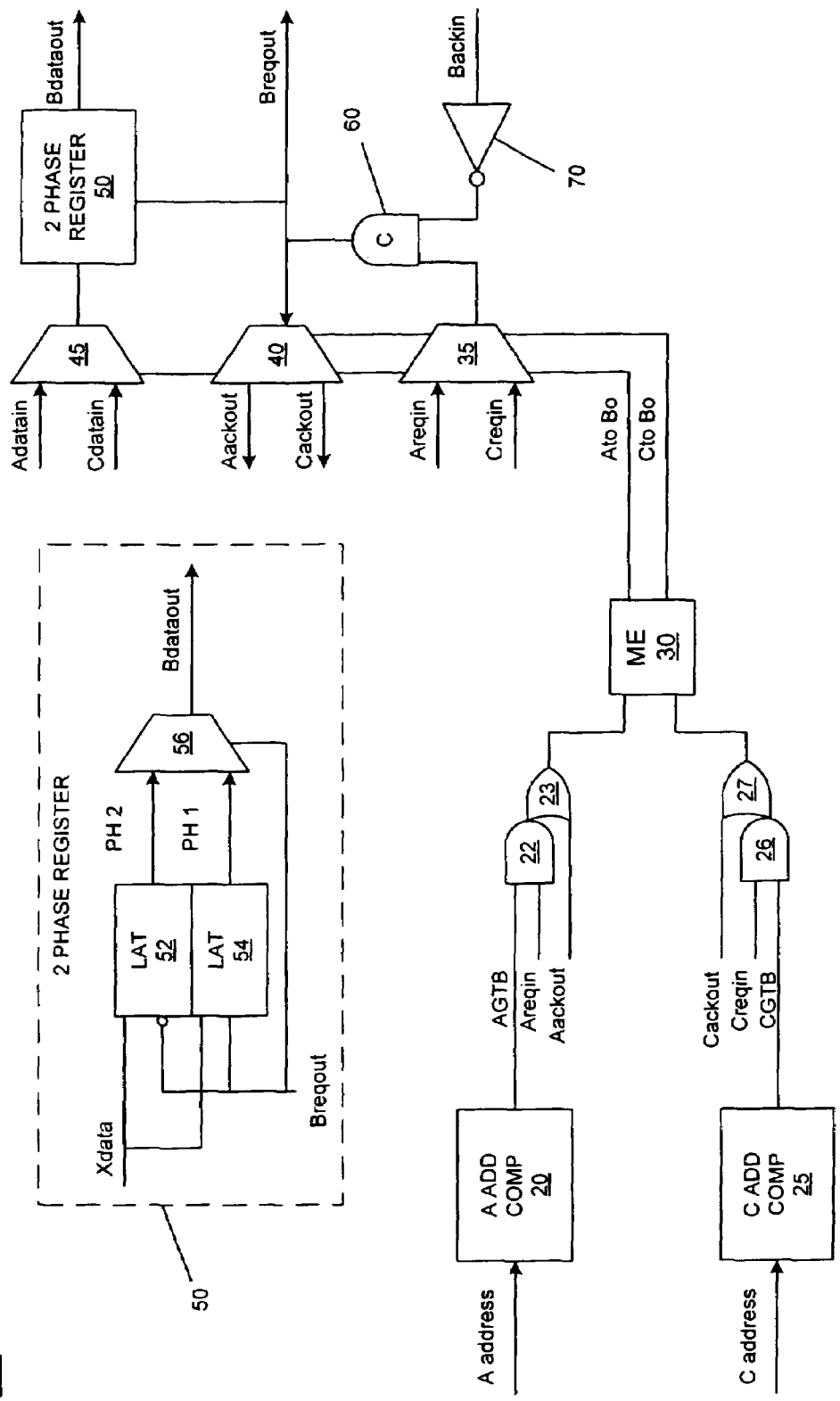
FIG. 1 is a block diagram of a circuit in accordance with one embodiment of the present invention.

In various embodiments, an asynchronous multiplexing bus controller (ABC) may be used to pass double data rate (DDR) data on a first-come-first-served basis. The circuit uses a request-acknowledge protocol. FIG. 1 shows a block diagram of a single output port. In one embodiment, each bus controller has three bi-directional ports with each input port multiplexing between two inputs and supplying a single output port. Data is passed through the bus controller in a DDR manner with a two-phase handshake.

Referring now to FIG. 1, shown is a block diagram of a circuit 10, which may correspond to a single output port of an ABC. As shown in FIG. 1, a pair of address comparators 20 and 25 is coupled to receive incoming addresses. Such address signals may be received from agents to which circuit 10 is coupled, for example, transmitters of a network-on-a-chip (NoC) system. Address comparator 20 compares the local address with the address in the token (i.e., a first phase of a data transmission from an agent) corresponding to an address of a target (receiving) agent to determine whether the Adatain should be routed through the Bdataout path. An alternative path, not shown, would be for the Adatain to be routed out of another output path. The corresponding outputs of address comparators 20 and 25 are provided to logic circuitry including first logic gates 22 and 26, which may be AND gates that receive the selected output of the address comparators (i.e., A goes to B (AGTB) and C goes to B (CGTB)) along with corresponding request signals (Areqin and Creqin) from the agents. In turn, logic gates 22 and 26 are coupled to logic gates 23 and 27, which may be OR gates also coupled to receive corresponding acknowledgement output signals (Aackout and Cackout). The outputs of gates 23 and 27 are coupled to a mutual-exclusion (ME) unit 30, which will be discussed further below.

The output from ME unit 30 may be used to control various selection units including a first multiplexer 35 and a de-multiplexer 40. As shown, first multiplexer 35 receives the incoming request signals from the agents, and a selected output is provided to a logic circuitry 60, which may be a C-element, which is further coupled to receive an acknowledgement input signal (Backin) from an agent to which circuit 10 is coupled (i.e., a next agent or receiver agent) through an inverter 70. Logic 60 has the function that the output changes state to a high only when both inputs are high and it remains in that state until both inputs go low. The output will then remain low until both inputs go high again. Logic 60 thus generates a request output signal (Breqout) which is provided to a given one of the transmitter agents through de-multiplexer 40, and which is also provided to the receiving agent, which could be another ABC, and to a two-phase register 50 that receives incoming data from a second multiplexer 45. Two-phase register 50 is coupled to provide the data out to the receiving agent (i.e., Bdataout).

As shown in the close-up in FIG. 1, two-phase register 50 includes a pair of latches 52 and 54, inversely controlled by the request output signal. The latches in turn receive the incoming data which is provided in a DDR manner with a two-phase handshake to a multiplexer 56 which, under control of the request output signal, provides the data out to the receiving agent. While shown with this particular implementation in the embodiment of FIG. 1, the scope of the present invention is not limited in this regard.

In the basic operation of an ABC in accordance with an embodiment of the present invention, a request is made from one of two transmitters attached to the A or C ports for the ABC unit to accept the incoming data and forward that data out of the B port to the next agent. Initially, all the request and acknowledge signals are reset to a low state (as shown in the timing diagram of FIG. 2). The request signals are Areqin, Creqin, and Breqout. The acknowledge signals are Aackout, Cackout, and Backin. In order to transmit data, the ABC must select which of the input ports to service. This is done on a first-come-first-served protocol. In this example we will assume that the A port receives information from its transmitter before the C port receives information. ME unit 30 is a mutual-exclusion element which has the responsibility to determine which of the inputs arrived first. If the inputs arrive simultaneously the output of ME unit 30 may be delayed but it is guaranteed not to glitch or display an intermediate state. Once that decision is made, the ABC multiplexers and de-multiplexers are aligned to handle the appropriate setup. With this decision, the first part of a two part (DDR) token is captured in the two-phase register and an acknowledge high signal is returned to the winning transmitter. At the same time a request is sent to either a downstream ABC or another data consuming agent. With the acknowledge receipt, the winning A transmitter is free to send the second part of the token to the ABC. Upon arrival of the second part of the token, the ABC acknowledges receipt by lowering the Aackout in a two-phase handshake.

Figure 2:
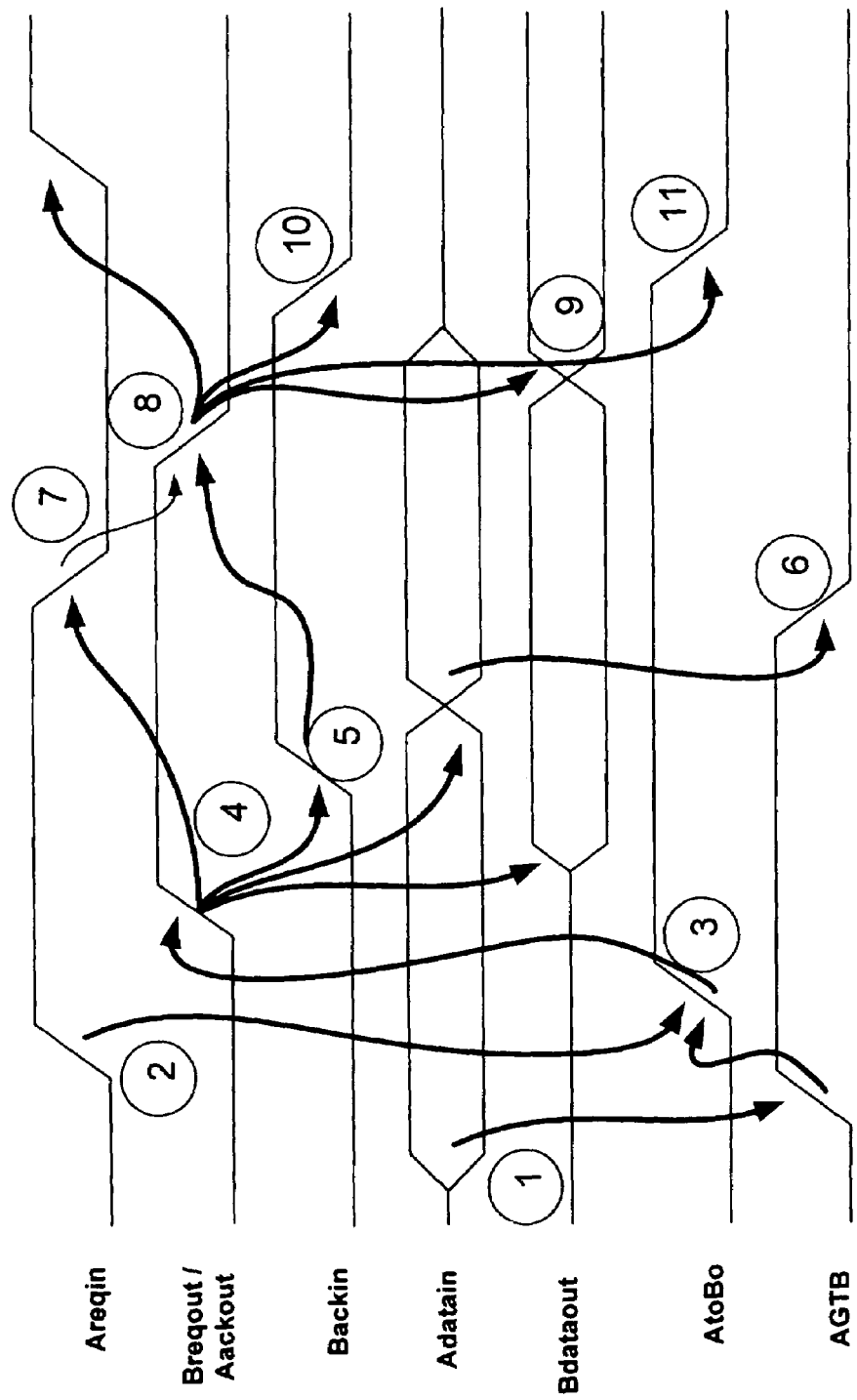
FIG. 2 is a timing diagram of a system in accordance with one embodiment of the present invention.

FIG. 2 shows operation of an ABC to transmit data from a first agent (i.e., agent A) as a timing diagram. As shown in FIG. 2, at a first time instance, a first phase of a data word (i.e., token) is transmitted from agent A as Adatain, and which includes the address. The address could be the whole first phase or only part of it with other data traveling with the address. Thereafter (or essentially coincident with the Adatain/address), agent A asserts a request signal (Areqin). By way of the data provided in the first token, address comparator 20 generates the A goes to B (AGTB) signal. Thus when the request from agent A is asserted, the logic circuitry 22 and 23 is activated, causing ME unit 30 to generate the A to B (AtoBo) signal at time instant 3, which in turn causes generation of both the B request output signal (Breqout) and the agent A acknowledgement signal (Aackout). This also triggers transmission of the first phase of data from the ABC as Bdataout and also enables agent A to transmit the second part of the token. Thus the first phase of data is latched into latch 54 when the request output signal (Breqout) is asserted, enabling the PH 1 output to pass through multiplexer 56. When that data is acknowledged by the downstream device such as a receiving agent, its acknowledgement signal (Backin) is asserted. Thus when the first part of the token is received by the downstream port, the B acknowledgement signal (Backin) is received. At time instant 6 the AGTB signal is deasserted if Adatain has changed, at time instant 7 (which could be essentially coincident to time instant 6, the timing requirement is that each data phase must be stable before the Breqout changes state) the Areqin signal is deasserted, causing the output of logic 60 to go low, which in turn causes deassertion of the Breqout and Aackout signals at time instant 8. This in turn enables transmission of the second part of the token from latch 52 and through multiplexer 56 as Bdataout at time instant 9, in turn causing deassertion of the Backin signal upon receipt of the second part of the token at the downstream port. Still further, releasing the Aackout signal causes the AtoBo signal to be deasserted, thus completing transmission of the token. While shown with this example timing in the embodiment of FIG. 2, understand the scope of the present invention is not limited in this regard.

Observe that in FIG. 2, assertion of the Aackout signal holds the AtoBo signal asserted until the Areqin signal is deasserted and the Backin signal is asserted. It is only after the Aackout signal is deasserted that the ME unit is released to choose the C input. Note that the two phases of data may be arranged in wide word formats. The first phase may include address information as well as at least some amount of data, while the second phase may be solely data. By using two phases, improved speed may be realized over a 4-phase handshake. Sending data in two phases also reduces wire count compared to a single phase transmission. When a completed data word (i.e., both phases) is transferred from circuit 10, the various control signals (i.e., the request and acknowledge signals) are returned to a neutral state. At this point, if the other agent (i.e., agent C) has pending data to transmit, it may immediately obtain control of the bus. Note that PH 1 of a new data cannot be passed into the ABC from either input port until the old PH 2 data has been acknowledged (Backin) by the downstream agent.

Figure 3:
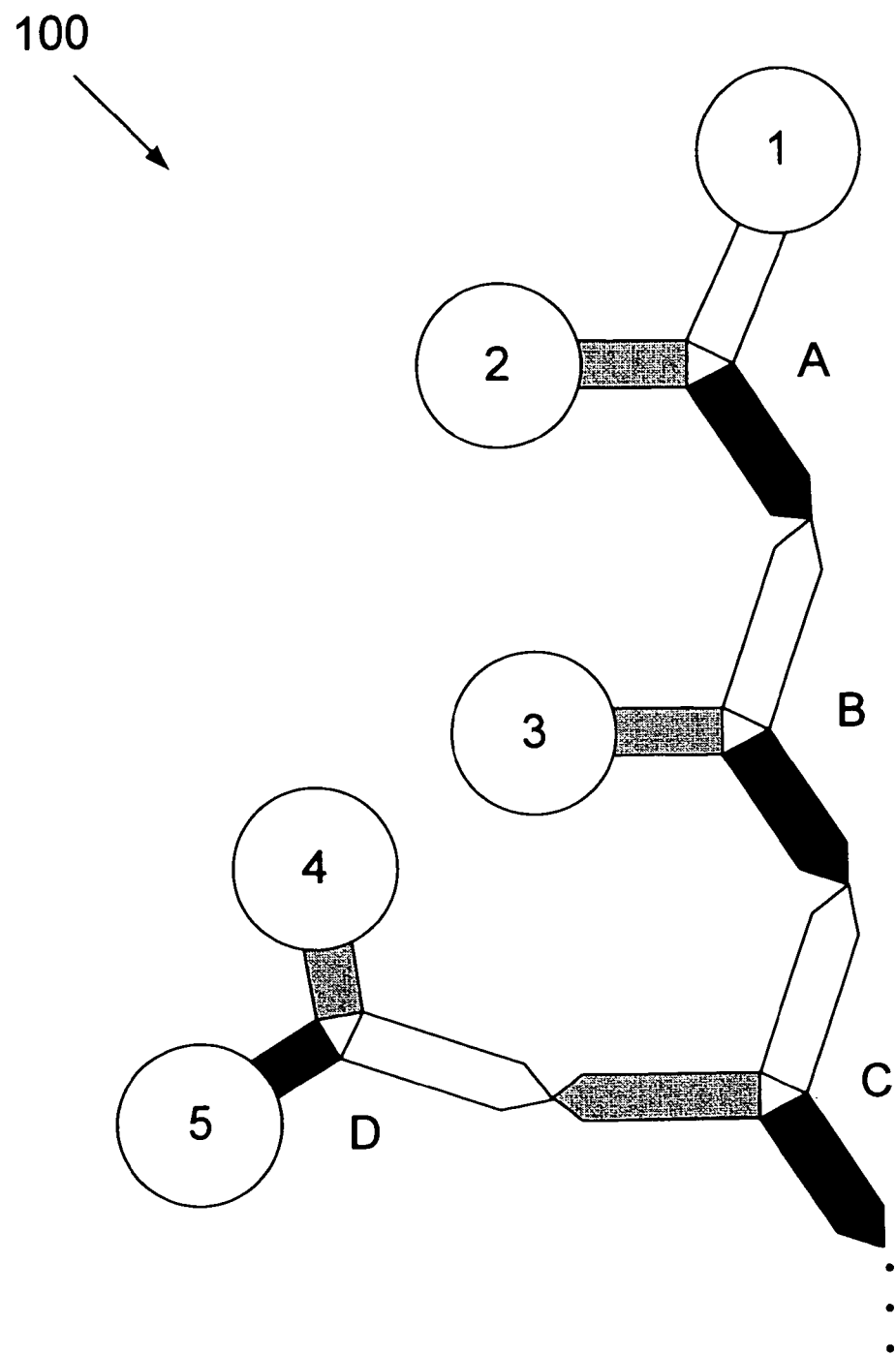
FIG. 3 is a block diagram of a system including asynchronous bus controllers in accordance with an embodiment of the present invention.

Referring now to FIG. 3, shown is a block diagram of a system including asynchronous bus controllers in accordance with an embodiment of the present invention. As shown in FIG. 3, system 100 which may be any type of computing platform includes a plurality of 3-ported bus controllers A-D. Each bus controller can also be coupled to one or more agents such as various semiconductor devices such as processors, chipsets, memories, wireless devices and so forth. In the specific embodiment shown in FIG. 3, a pair of agents 1 and 2 are coupled to bus controller A, another agent 3 is coupled bus controller B, while agents 4 and 5 are coupled to bus controller D. All of these agents may act both as receiving and transmitting agents. Note that the chain shown in FIG. 3 can be extended indefinitely. Specifically, bus controller C may be coupled to another bus controller or to another agent. While shown with this particular implementation in the embodiment of FIG. 3, the scope of the present invention is not limited in this regard.

Figure 4:
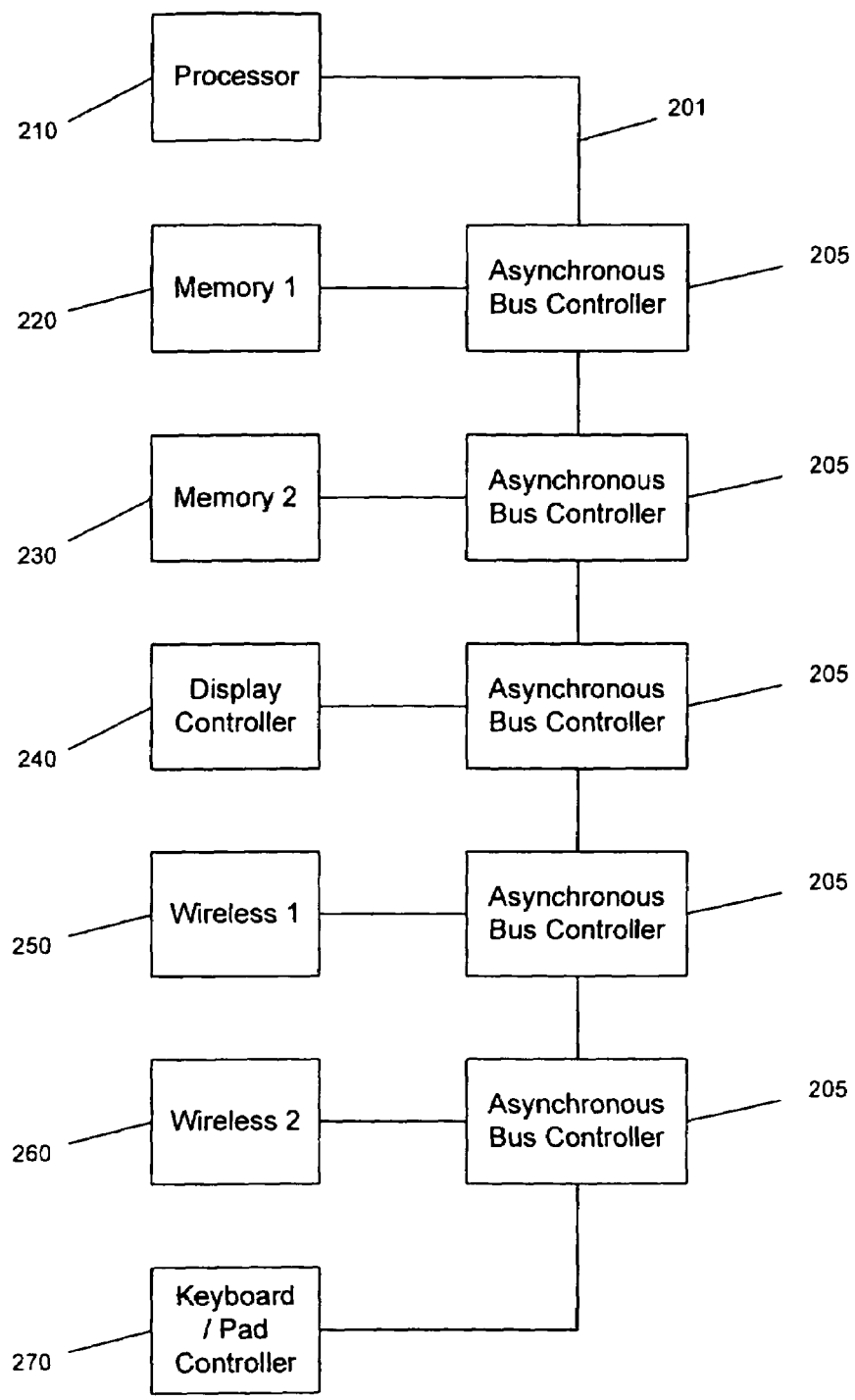
FIG. 4 is a block diagram of a system in accordance with another embodiment of the present invention.

Embodiments thus provide a low power, and high-speed way to pass DDR data over a network-on-chip, improving ultra-mobile designs in terms of power, complexity, and latency. Referring now to FIG. 4, shown is a block diagram of a system in accordance with another embodiment of the present invention. As shown in FIG. 4, system 200 may be a network-on-a-chip (NoC) implementation such as a low power ultra-mobile device. In one embodiment, all of system 200 may be integrated on a single substrate, i.e., within a single integrated circuit, although the scope of the present invention is not limited in this regard.

As shown in FIG. 4, various components may be coupled to an asynchronous bus 201 via a plurality of asynchronous bus controllers 205 in accordance with an embodiment of the present invention to provide access to a shared routing path, namely an asynchronous bus 201. In the embodiment of FIG. 4, each bus controller 205 may include three bi-directional ports. While shown with five asynchronous bus controllers in the embodiment of FIG. 4 for ease of illustration, understand that additional or fewer such bus controllers may be present, with various components coupled to each such bus controller. As shown in FIG. 4, components coupled to asynchronous bus 201 by bus controllers 205 include a processor 210, which may be a microprocessor, programmable logic device or other such processing circuitry, a first memory 220 and a second memory 230. In various embodiments, first memory 220 may be a relatively high speed smaller storage such as dynamic random access memory (DRAM), while second memory 230 may provide for non-volatile storage such as via flash or other semiconductor, optical, or other such media.

Referring still to FIG. 4, system 200 further includes a display controller 240, which may be coupled to a display of the mobile device, such as a liquid crystal display. Still further, in some implementations multiple wireless components including a first wireless component 250 and a second wireless component 260 may be present. For example, one of the wireless components may be a short range radio device such as a Bluetooth™ or other short range device such as a wireless communicator for use in a wireless local area network (WLAN), while the other wireless component may be for a cellular network or an ultrawideband network, for example. Still further, a controller for an input device such as a keyboard/pad controller 270 may also be present. While shown with this particular implementation in the embodiment of FIG. 4, the scope of the present invention is not limited in this regard. As discussed above, various components in system 200 may obtain control asynchronous bus 201 for transmission of data by first gaining access through one of bus controllers 205 using the two-phase handshake technique described above.

Embodiments may be implemented in code and may be stored on a storage medium having stored thereon instructions which can be used to program a system to perform the instructions. The storage medium may include, but is not limited to, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An apparatus comprising:
a mutual exclusion unit to receive a data transmission request from a first agent and a second agent and to select one of the first or second agents for servicing based on which agent is the first to send the data transmission request;
a first selection unit to receive the data transmission request from the first and second agents, the first selection unit controlled by the mutual exclusion unit to provide a control output to a logic unit;
a second selection unit to receive a request output signal from the logic unit and to provide an acknowledgement signal to the selected one of the first and second agents, the second selection unit controlled by the mutual exclusion unit;
a third selection unit to receive data from the first and second agents and to pass data from the selected first or second agent to a two-phase register; and
the two-phase register coupled to the third selection unit to transmit the data responsive to the request output signal.

2. The apparatus of claim 1, wherein the two-phase register is operable to transmit the data in a double data rate manner with a two-phase handshake.

3. The apparatus of claim 2, wherein the two-phase register includes a first latch and a second latch to receive the data and to pass the data in a two-phase manner responsive to the request output signal, and a multiplexer to transmit the data received from the first and second latches responsive to the request output signal.

4. The apparatus of claim 2, wherein the data comprises a word including a first phase having an address of a target agent and at least some data information, and the second phase having data information.

5. The apparatus of claim 1, wherein the apparatus comprises an asynchronous multiplexing bus controller coupled to an asynchronous bus.

6. The apparatus of claim 5, wherein the asynchronous multiplexing bus controller is adapted on a single integrated circuit with the first agent and the second agent.

7. The apparatus of claim 5, wherein the mutual exclusion unit is to control the first and second selection units to service the first agent when the acknowledgement signal is sent to the first agent until the data transmission request from the first agent is deasserted and a receive acknowledgement signal from a downstream agent coupled to the asynchronous multiplexing bus controller is asserted.

8. A system comprising:
a processor to execute operations responsive to instructions;
an asynchronous bus coupled to the processor;
a wireless agent coupled to the asynchronous bus; and
an asynchronous bus controller coupled to the asynchronous bus, the asynchronous bus controller including a mutual exclusion unit to receive a data transmission request from the processor and the wireless agent and to select one of the processor or the wireless agent for servicing based on which is the first to send the data transmission request, a first multiplexer to receive the data transmission request from the processor and the wireless agent, the first multiplexer controlled by the mutual exclusion unit to provide a control output to a logic unit, a de-multiplexer to receive a request output signal from the logic unit and to provide an acknowledgement signal to the selected one of the processor and the wireless agent, the de-multiplexer controlled by the mutual exclusion unit, a second multiplexer to receive data from the processor and the wireless agent and to pass data from the selected processor or the wireless agent to a two-phase register, wherein the two-phase register is to transmit the data responsive to the request output signal.

9. The system of claim 8, wherein the two-phase register is operable to transmit the data in a double data rate manner with a two-phase handshake.

10. The system of claim 9, wherein the two-phase register includes a first latch and a second latch to receive the data and to pass the data in a two-phase manner responsive to the request output signal, and a third multiplexer to transmit the data received from the first and second latches responsive to the request output signal.

11. The system of claim 10, wherein the data corresponds to a word including a first phase having an address of a target agent and at least some data information, and the second phase having data information.

12. The system of claim 11, wherein the asynchronous bus controller is adapted on a single integrated circuit with the processor and the wireless agent.

13. The system of claim 11, wherein the mutual exclusion unit is to control the first multiplexer and the de-multiplexer to service the processor when the acknowledgement signal is sent to the processor until the data transmission request from the processor is deasserted and a receive acknowledgement signal from the target agent coupled to the asynchronous bus controller is asserted.

14. The system of claim 8, wherein the selected one of the processor and the wireless agent is to send a second phase of the data to the second multiplexer responsive to the acknowledgement signal.

15. The system of claim 14, wherein the two-phase register is to prevent transmission of the second phase of the data until the request output signal is deasserted.

* * * * *